United States Patent
Jiao et al.

(10) Patent No.: US 12,238,658 B2
(45) Date of Patent: Feb. 25, 2025

(54) BEAM TRAINING METHOD AND RELATED DEVICE

(71) Applicant: HUAWEI TECHNOLOGIES CO., LTD., Guangdong (CN)

(72) Inventors: Chunxu Jiao, Shanghai (CN); Pu Yuan, Shenzhen (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 332 days.

(21) Appl. No.: 17/851,790

(22) Filed: Jun. 28, 2022

(65) Prior Publication Data

US 2022/0330186 A1 Oct. 13, 2022

Related U.S. Application Data

(63) Continuation of application No. PCT/CN2019/130507, filed on Dec. 31, 2019.

(51) Int. Cl.
  *H04W 56/00* (2009.01)
  *H04B 7/06* (2006.01)
  *H04W 92/18* (2009.01)

(52) U.S. Cl.
  CPC ........ *H04W 56/001* (2013.01); *H04B 7/0617* (2013.01); *H04W 92/18* (2013.01)

(58) Field of Classification Search
  CPC ... H01L 33/502; H01L 33/483; H01L 33/486; H01L 33/58
  See application file for complete search history.

(56) References Cited

U.S. PATENT DOCUMENTS

| 2017/0280406 A1 | 9/2017 | Sheng |
| 2019/0261294 A1* | 8/2019 | Gupta ............... H04W 72/0446 |

FOREIGN PATENT DOCUMENTS

| CN | 105376770 A | 3/2016 |
| CN | 109246659 A | 1/2019 |

(Continued)

OTHER PUBLICATIONS

Extended European Search Report in European Appln No. 19958601.7, dated Oct. 28, 2022, 8 pages.

(Continued)

*Primary Examiner* — Jamal Javaid
(74) *Attorney, Agent, or Firm* — Fish & Richardson P.C.

(57) ABSTRACT

Example beam training methods and apparatus are described. In one example method, a first terminal apparatus sends a first message to a second terminal apparatus, where the first message includes a request for a first list, the first list includes an identifier of at least one sidelink synchronization signal, and the at least one sidelink synchronization signal is a sidelink synchronization signal that is not used by the second terminal apparatus within a preset time range and/or that is not used by another terminal apparatus within an area in which the second terminal apparatus is located. The first terminal apparatus receives a second message from the second terminal apparatus, where the second message includes the first list. A first sidelink synchronization signal is determined based on the identifier of the at least one sidelink synchronization signal in the first list. The first sidelink synchronization signal is used for beam training.

16 Claims, 5 Drawing Sheets

(56) References Cited

FOREIGN PATENT DOCUMENTS

WO  WO-2019078661 A1 * 4/2019 ........... H04B 7/0695
WO     2019128873 A1   7/2019

OTHER PUBLICATIONS

PCT International Search Report and Written Opinion issued in International Application No. PCT/CN2019/130507 on Sep. 27, 2020, 15 pages (with English translation).
Vivo, "NR sidelink synchronization mechanism," 3GPP TSG RAN WG1 Meeting #94bis, R1-1810390, Chengdu, China, Oct. 8-12, 2018, 5 pages.

* cited by examiner

FIG. 1

| PSBCH | SL-PSS | SL-PSS | SL-SSS | SL-SSS | PSBCH | PSBCH | PSBCH | PSBCH | PSBCH | PSBCH | PSBCH | PSBCH | GAP |

BEAM TRAINING METHOD AND RELATED DEVICE

CROSS-REFERENCE TO RELATED APPLICATIONS

This application is a continuation of International Application No. PCT/CN2019/130507, filed on Dec. 31, 2019, the disclosure of which is hereby incorporated by reference in its entirety.

TECHNICAL FIELD

This application relates to the field of network technologies, and in particular, to a beam training method and a related device.

BACKGROUND

In the past several decades, wireless communication systems experienced technical evolution from first-generation analogue communication to fifth-generation mobile communication technology (5th Generation, 5G) new radio (NR). Beam management is an important technology proposed by 5G NR. The beam management is a process in which a 5G base station (next generation NodeB, gNB) and user equipment (UE) obtain and maintain a beam set used for sending data or receiving data. Vehicle-to-vehicle (V2V) is a special scenario of internet of vehicles (vehicle-to-everything, V2X), and V2V communication is mainly used for sidelink (SL) communication between vehicles. However, in an SL unicast scenario such as V2V, beam training of the SL cannot be implemented by using a sidelink synchronization signal block (SL-SSB) in current technologies, resulting in low data transmission efficiency.

SUMMARY

Embodiments of this application provide a beam training method and a related device, to implement sidelink beam training and improve data transmission efficiency.

According to a first aspect, an embodiment of this application provides a beam training method, including: A first terminal apparatus sends a first message to a second terminal apparatus, where the first message is used to request a first list, the first list includes an identifier of at least one sidelink synchronization signal, the at least one sidelink synchronization signal is a sidelink synchronization signal that is not used by the second terminal apparatus within a preset time range and/or that is not used by another terminal apparatus within an area in which the second terminal apparatus is located, and the sidelink synchronization signal includes a primary synchronization signal and a secondary synchronization signal; receives a second message from the second terminal apparatus, where the second message includes the first list; and determines a first sidelink synchronization signal based on the identifier of the at least one sidelink synchronization signal in the first list, where the first sidelink synchronization signal is used for beam training.

Technical effects: The first terminal apparatus and the second terminal apparatus obtain an available sidelink synchronization signal identifier SL-SSID through negotiation. The second terminal apparatus may determine, based on the SL-SSID, SL-SSBs from the first terminal apparatus that performs beam training with the second terminal apparatus, and perform beam training feedback on the received SL-SSBs. Because different SL-SSIDs are used, an SL-SSID collision is avoided. In addition, the first terminal apparatus triggers SL-SSB sending to implement SL beam training, and then performs data transmission by using a trained beam, so that data transmission efficiency is improved.

In a possible design, the first terminal apparatus determines a first sidelink synchronization signal block set based on the first sidelink synchronization signal, where a sidelink synchronization signal block in the first sidelink synchronization signal block set includes the first sidelink synchronization signal; and the first sidelink synchronization signal block set is used for beam training. Beam training is performed by using the first sidelink synchronization signal block set, so that the second terminal apparatus can perform feedback on SSBs in different transmit beam directions, thereby ensuring beam training accuracy.

In another possible design, the first terminal apparatus selects an identifier of the first sidelink synchronization signal from the first list; and determines the first sidelink synchronization signal based on the identifier of the first sidelink synchronization signal. The first sidelink synchronization signal is determined by using the selected identifier of the first sidelink synchronization signal, so that an SL-SSID collision is avoided.

In another possible design, the first terminal apparatus sends a third message to the second terminal apparatus, where the third message includes the identifier of the first sidelink synchronization signal, and the third message is used to notify the second terminal apparatus that the first sidelink synchronization signal is determined based on the identifier of the first sidelink synchronization signal. The second terminal apparatus is notified of the identifier of the first sidelink synchronization signal, so that the second terminal apparatus performs beam training feedback on the SL-SSB sent by the first terminal apparatus, thereby ensuring successful beam training.

In another possible design, the first terminal apparatus sends a fourth message, where the fourth message includes an identifier of the first sidelink synchronization signal, and the fourth message is used to notify all terminal apparatuses within an area in which the first terminal apparatus is located that the identifier of the first sidelink synchronization signal has been used. In this way, all terminal apparatuses that receive the fourth message do not use the identifier of the first sidelink synchronization signal within the preset time range, so that an SL-SSID collision is avoided.

In another possible design, the first terminal apparatus receives a second message from the second terminal apparatus in a first time window. A message is received within the triggered first time window, so that successful transmission of the message is ensured and transmission efficiency of the message is ensured.

According to a second aspect, an embodiment of this application provides a beam training method, including: A second terminal apparatus receives a first message from a first terminal apparatus, where the first message is used to request a first list, the first list includes an identifier of at least one sidelink synchronization signal, the at least one sidelink synchronization signal is a sidelink synchronization signal that is not used by the second terminal apparatus within a preset time range and/or that is not used by another terminal apparatus within an area in which the second terminal apparatus is located, the sidelink synchronization signal includes a primary synchronization signal and a secondary synchronization signal, and the at least one sidelink synchronization signal is used for beam training; and the second terminal apparatus sends a second message to the first terminal apparatus, where the second message includes the first list.

Technical effects: The first terminal apparatus and the second terminal apparatus obtain an available sidelink synchronization signal identifier SL-SSID through negotiation. The second terminal apparatus may determine, based on the SL-SSID, SL-SSBs from the first terminal apparatus that performs beam training with the second terminal apparatus, and perform beam training feedback on the received SL-SSBs. Because different SL-SSIDs are used, an SL-SSID collision is avoided. In addition, the first terminal apparatus triggers SL-SSB sending to implement SL beam training, and then performs data transmission by using a trained beam, so that data transmission efficiency is improved.

In a possible design, the second terminal apparatus receives a third message from the first terminal apparatus, where the third message includes an identifier of a first sidelink synchronization signal in the first list; and the third message is used to notify the second terminal apparatus that the first sidelink synchronization signal is determined based on the identifier of the first sidelink synchronization signal. The second terminal apparatus is notified of the identifier of the first sidelink synchronization signal, so that the second terminal apparatus performs beam training feedback on the SL-SSB sent by the first terminal apparatus, thereby ensuring successful beam training.

In another possible design, the first sidelink synchronization signal is used to determine a first sidelink synchronization signal block set, a sidelink synchronization signal block in the first sidelink synchronization signal block set includes the first sidelink synchronization signal, and the first sidelink synchronization signal block set is used for beam training. Beam training is performed by using the first sidelink synchronization signal block set, so that the second terminal apparatus can perform feedback on SSBs in different transmit beam directions, thereby ensuring beam training accuracy.

In another possible design, the second terminal apparatus receives the third message from the first terminal apparatus in a second time window. A message is received within the triggered first time window, so that successful transmission of the message is ensured and transmission efficiency of the message is ensured.

According to a third aspect, an embodiment of this application provides a beam training method, including: A first terminal apparatus determines a first message, where the first message includes a first list, the first list includes an identifier of at least one sidelink synchronization signal, the at least one sidelink synchronization signal is a sidelink synchronization signal that is not used by the first terminal apparatus within a preset time range and/or that is not used by another terminal apparatus within an area in which the first terminal apparatus is located, the sidelink synchronization signal includes a primary synchronization signal and a secondary synchronization signal, and the at least one sidelink synchronization signal is used for beam training; and sends the first message to a second terminal apparatus.

Technical effects: The first terminal apparatus and the second terminal apparatus obtain an available SL-SSID through negotiation. The first terminal apparatus may determine, based on the SL-SSID, SL-SSBs from the second terminal apparatus that performs beam training with the first terminal apparatus, and perform beam training feedback on the received SL-SSBs. Because different SL-SSIDs are used, an SL-SSID collision is avoided. In addition, the second terminal apparatus triggers SL-SSB sending to implement SL beam training, and then performs data transmission by using a trained beam, so that data transmission efficiency is improved.

In a possible design, the first terminal apparatus receives a second message from the second terminal apparatus, where the second message includes an identifier of a first sidelink synchronization signal in the first list, and the second message is used to notify the first terminal apparatus that the first sidelink synchronization signal is determined based on the identifier of the first sidelink synchronization signal. The first terminal apparatus is notified of the identifier of the first sidelink synchronization signal, so that the first terminal apparatus performs beam training feedback on the SL-SSB sent by the second terminal apparatus, thereby ensuring successful beam training.

In another possible design, the first sidelink synchronization signal is used to determine a first sidelink synchronization signal block set, a sidelink synchronization signal block in the first sidelink synchronization signal block set includes the first sidelink synchronization signal, and the first sidelink synchronization signal block set is used for beam training. Beam training is performed by using the first sidelink synchronization signal block set, so that the first terminal apparatus can perform feedback on SSBs in different transmit beam directions, thereby ensuring beam training accuracy.

In another possible design, the first terminal apparatus receives a second message from the second terminal apparatus in a first time window. A message is received within the triggered first time window, so that successful transmission of the message is ensured and transmission efficiency of the message is ensured.

According to a fourth aspect, an embodiment of this application provides a beam training method, including: A second terminal apparatus receives a first message from a first terminal apparatus, where the first message includes a first list, the first list includes an identifier of at least one sidelink synchronization signal, the at least one sidelink synchronization signal is a sidelink synchronization signal that is not used by the first terminal apparatus within a preset time range and/or that is not used by another terminal apparatus within an area in which the first terminal apparatus is located, and the sidelink synchronization signal includes a primary synchronization signal and a secondary synchronization signal; determine a first sidelink synchronization signal based on the identifier of the at least one sidelink synchronization signal in the first list, where the first sidelink synchronization signal is used for beam training.

Technical effects: The first terminal apparatus and the second terminal apparatus obtain an available SL-SSID through negotiation. The first terminal apparatus may determine, based on the SL-SSID, SL-SSBs from the second terminal apparatus that performs beam training with the first terminal apparatus, and perform beam training feedback on the received SL-SSBs. Because different SL-SSIDs are used, an SL-SSID collision is avoided. In addition, the second terminal apparatus triggers SL-SSB sending to implement SL beam training, and then performs data transmission by using a trained beam, so that data transmission efficiency is improved.

In a possible design, the second terminal apparatus determines a first sidelink synchronization signal block set based on the first sidelink synchronization signal, where a sidelink synchronization signal block in the first sidelink synchronization signal block set includes the first sidelink synchronization signal, and the first sidelink synchronization signal block set is used for beam training. Beam training is performed by using the first sidelink synchronization signal block set, so that the first terminal apparatus can perform feedback on SSBs in different transmit beam directions, thereby ensuring beam training accuracy.

In another possible design, the second terminal apparatus selects an identifier of the first sidelink synchronization signal from the first list, and determines the first sidelink synchronization signal based on the identifier of the first sidelink synchronization signal. The first sidelink synchronization signal is determined by using the selected identifier of the first sidelink synchronization signal, so that an SL-SSID collision is avoided.

In another possible design, the second terminal apparatus sends a second message to the first terminal apparatus, where the second message includes the identifier of the first sidelink synchronization signal, and the second message is used to notify the first terminal apparatus that the first sidelink synchronization signal is determined based on the identifier of the first sidelink synchronization signal. The first terminal apparatus is notified of the identifier of the first sidelink synchronization signal, so that the first terminal apparatus performs beam training feedback on the SL-SSB sent by the second terminal apparatus, thereby ensuring successful beam training.

In another possible design, the second terminal apparatus sends a third message, where the third message includes the identifier of the first sidelink synchronization signal, and the third message is used to notify all terminal apparatuses within an area in which the second terminal apparatus is located that the identifier of the first sidelink synchronization signal has been used. In this way, all terminal apparatuses that receive the third message do not use the identifier of the first sidelink synchronization signal within the preset time range, so that an SL-SSID collision is avoided.

According to a fifth aspect, an embodiment of this application provides a first terminal apparatus. The first terminal apparatus is configured to implement the methods and functions performed by the first terminal apparatus in the first aspect and the third aspect, and is implemented by hardware/software. The hardware/software includes modules corresponding to the foregoing functions.

According to a sixth aspect, an embodiment of this application provides a second terminal apparatus. The second terminal apparatus is configured to implement the methods and functions performed by the second terminal apparatus in the second aspect and the fourth aspect, and is implemented by hardware/software. The hardware/software includes modules corresponding to the foregoing functions.

According to a seventh aspect, an embodiment of this application provides a first terminal device, including a processor, a memory, and a communication bus. The communication bus is configured to implement connection and communication between the processor and the memory. The processor executes a program stored in the memory, to implement the steps in the first aspect and the third aspect.

In a possible design, the terminal device provided in this application may include corresponding modules configured to perform the behavior of the first terminal apparatus in the foregoing method designs. The module may be software and/or hardware.

According to an eighth aspect, an embodiment of this application provides a second terminal device, including a processor, a memory, and a communication bus. The communication bus is configured to implement connection and communication between the processor and the memory. The processor executes a program stored in the memory, to implement the steps provided in the second aspect and the fourth aspect.

In a possible design, the network device provided in this application may include corresponding modules configured to perform the behavior of the second terminal apparatus in the foregoing method designs. The module may be software and/or hardware.

According to a ninth aspect, this application provides a computer-readable storage medium. The computer-readable storage medium stores instructions. When the instructions are run on a computer, the computer is enabled to perform the methods in the foregoing aspects.

According to a tenth aspect, this application provides a computer program product. The computer program product is configured to store a computer program. When the computer program is run on a computer, the computer is enabled to perform the method according to any one of the foregoing aspects.

According to an eleventh aspect, an embodiment of this application provides a communication system. The communication system includes the first terminal apparatus according to any one of the foregoing aspects and the second terminal apparatus according to any one of the foregoing aspects.

BRIEF DESCRIPTION OF DRAWINGS

To describe the technical solutions in embodiments of this application or in the background more clearly, the following briefly describes the accompanying drawings for describing embodiments of this application or the background.

DESCRIPTION OF EMBODIMENTS

The following describes embodiments of this application with reference to the accompanying drawings in embodiments of this application.

Figure 1:
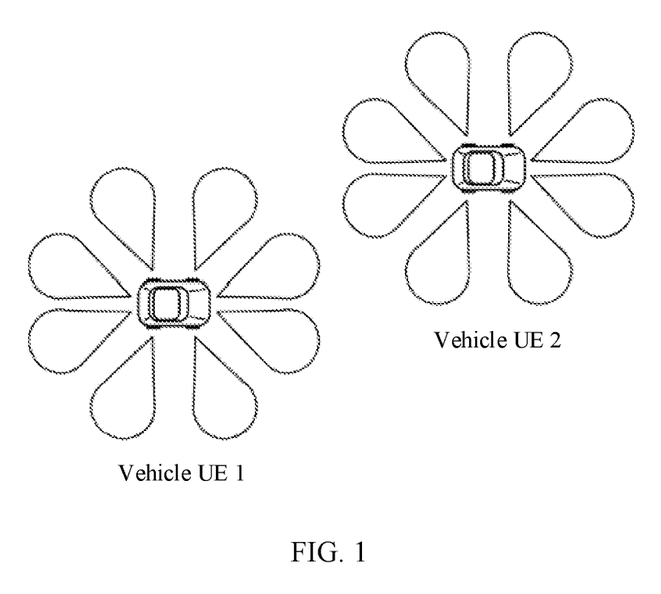
FIG. 1 is a schematic structural diagram of a communication system according to an embodiment of this application.

FIG. 1 is a schematic structural diagram of a communication system according to an embodiment of this application. The communication system includes a first terminal apparatus and a second terminal apparatus. In FIG. 1, vehicle user equipment having a V2X communication capability is used as an example. Vehicle UE 1 and vehicle UE 2 may transmit beams in different manners. The first terminal apparatus may directly communicate with the second terminal apparatus. The first terminal apparatus and the second terminal apparatus may be devices that provide a voice and/or data connection to a user, may be connected to a computing device such as a laptop computer or a desktop computer, or may be independent devices such as personal digital assistants (PDAs). The first terminal apparatus and the second terminal apparatus may alternatively be user equipment, for example, vehicles, subscriber units, subscriber stations, mobile stations, mobile consoles, remote stations, access points, remote terminals, access terminals, user terminals, user agents, user apparatuses, or vehicle-mounted terminals. Both the first terminal apparatus and the second terminal apparatus may be chips, for example, processors.

The communication system may be applied to an NR-V2X system, or may be applied to another communication system. The communication system may be applied to a scenario in which a plurality of slots are aggregated or a plurality of carriers are aggregated. The communication system is mainly used for sidelink communication between user equipments. The first terminal apparatus and the second terminal apparatus may be located in a coverage area of a same cell, or may be located in coverage areas of different cells, or may be located in a coverage area with no mobile network. A configuration of a communication link, and a communication resource between the first terminal apparatus and the second terminal apparatus may be configured by user equipment, or may be configured by a network device.

In the communication system, a public land mobile network (PLMN), a device-to-device (D2D) network, a machine-to-machine (M2M) network, an internet of things (IoT), or another network may be used. The communication system may be applied to a 5G NR system, or may be applied to a non-terrestrial communication network, for example, a communication network in which a base station is located on a satellite or another flight device, or a communication network in which a satellite or a flight device is used as a relay for forwarding.

A frequency range 2 (FR2) is defined in the 5G system, so that frequency bands higher than 6 GHz can be deployed and applied. The FR2 has abundant spectrum resources and a large bandwidth range, and provides a data transmission channel for various new services that require high-capacity communication, such as virtual reality, high-definition video transmission, and V2X. Especially in the V2X scenario, the FR2 may implement functions such as vehicle platooning, an extended sensor, and self-driving. However, a PC5 interface of an SL has many features that an NR Uu interface does not have. Therefore, different technical problems need to be resolved.

Beam management is an important technology proposed by 5G NR for the FR2. The beam management is a process in which a 5G base station (next generation NodeB, gNB) and UE obtain and maintain a beam set used for sending or receiving data. The beam management includes beam training and beam failure recovery. The beam training includes transmit beam training and receive beam training. NR downlink beam training may include the following several steps.

Step 1: The gNB sends a reference signal (RS) by using a transmit beam set, where transmit beams in the transmit beam set correspond to different transmit directions, and the UE selects a transmit beam of the gNB and a receive beam of the UE by measuring the transmit beams and performing feedback to the transmit beams.

Step 2: The gNB sends an RS based on the transmit beam set selected in step 1, and the UE improves the transmit beam of the gNB by measuring the transmit beams and performing feedback to the transmit beams.

Step 3: The gNB transmits the RS by using the transmit beam improved in step 2, and the UE improves the receive beam of the UE by measuring the transmit beam.

In step 1, the RS may be an SSB synchronization signal block. A maximum of 64 transmit beams can be configured on the gNB. Each transmit beam corresponds to one SSB and one time-frequency resource. The time-frequency resource may be used by the UE for feedback. The gNB sequentially sends an SSB on each transmit beam in a scanning manner, and the UE measures the SSB to obtain reference signal received power (RSRP) of the SSB and performs feedback. The SSB includes two types of synchronization signals: a primary synchronization signal (PSS) and a secondary synchronization signal (SSS). Sequences of the two types of synchronization signals are generated based on synchronization signal identifiers (SSIDs). One SSID corresponds to one physical-layer cell identifier (physical-layer cell ID). The physical-layer cell identifier is determined by using the following formula:

$$N_{ID}^{cell} = 3N_{ID}^{(1)} + N_{ID}^{(2)}$$

where $N_{ID}^{(1)} \in \{0, 1, \ldots, 335\}$, and $N_{ID}^{(2)} \in \{0, 1, 2\}$. The sequence of the PSS is generated according to $N_{ID}^{(2)}$, and the sequence of the SSS is generated according to $N_{ID}^{(1)}$ and $N_{ID}^{(2)}$. After receiving the SSB, the UE performs blind detection on the PSS and the SSS to obtain corresponding $N_{ID}^{(1)}$ and $N_{ID}^{(2)}$ and then obtain $N_{ID}^{cell}$. Based on $N_{ID}^{cell}$ or corresponding SSIDs, the UE may distinguish between SSBs sent by various gNBs.

In V2V communication, an existing standard cannot provide a function similar to beam management on the foregoing downlink. A vehicle may obtain traveling information, sensor information, and the like of another vehicle in real time through V2V communication. In a vehicle platooning service, a vehicle at the head of a platoon sends vehicle operation information to the platoon in a V2V manner, so that subsequent vehicles can implement unmanned driving. For an extended sensor, after sensing another vehicle, a vehicle notifies the another vehicle of sensor information through V2V, so as to resolve a problem that environment perception is inaccurate because a sensor capability of the vehicle is limited. However, an SL-SSB is used only for synchronization, and is not used for beam management of an SL.

Figure 2:
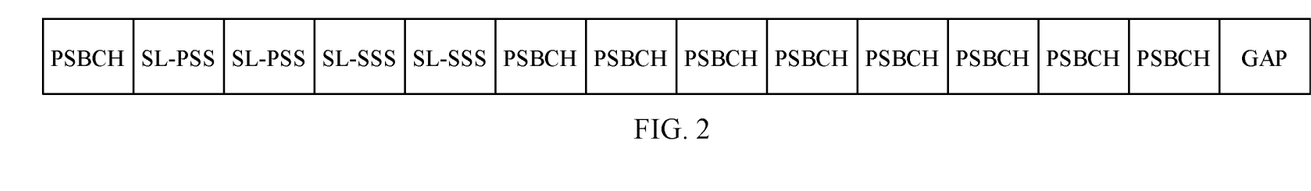
FIG. 2 is a schematic structural diagram of an SL-SSB frame according to an embodiment of this application.

FIG. 2 is a schematic structural diagram of an SL-SSB frame according to an embodiment of this application. The SL-SSB includes an SL-PSS, an SL-SSS, a physical layer sidelink broadcast channel (physical sidelink broadcast channel, PSBCH), and a gap symbol (GAP). Similar to the SSB, the SL-PSS in the SL-SSB has two types of sequences. When a sequence of the SL-PSS is specified, the SL-SSS has 336 types of sequences. Therefore, a total of 672 SL-SSIDs may be determined based on the sequence types of the SL-PSS and the SL-SSS. The following functions can be implemented by configuring SL-SSBs by using different SL-SSIDs:

First, identify a type of a synchronization source. The synchronization source in an existing standard includes a global navigation satellite system (GNSS), a gNB, reference UE, and the like. Different SL-SSBs are configured by using different SL-SSIDs, so that receive-end UEs can identify the type of the synchronization source. For example, when the SL-SSID is 0 or 336, the SL-SSID may be used to indicate that the type of the synchronization source is the GNSS.

Second, identify whether the synchronization source is covered or not. The synchronization source within the cell coverage can use SL-SSIDs ranging from 1 to 335, and the synchronization source outside the cell coverage can use SL-SSIDs ranging from 337 to 671.

Third, identify that the transmit-end UE is directly or indirectly connected to the synchronization source. When sending the SL-SSB, the transmit-end UE may be directly or indirectly connected to the synchronization source to use the SL-SSID. For the transmit-end UE directly connected to the synchronization source, a synchronization priority corresponding to a used SL-SSID is relatively high. For the transmit-end UE indirectly connected to the synchronization source, a synchronization priority corresponding to a used SL-SSID is relatively low.

In addition, an SL-SSB sending method in long term evolution internet of vehicles (LTE V2X, LTE-V) is still used in the current technology. SL-SSB sending may be triggered by a gNB or UE, and the SL-SSB sending is triggered for synchronization. Currently, the transmit-end UE does not trigger SL-SSB sending of the transmit-end UE even if the transmit-end UE needs to perform SL beam training with the receive-end UE. Disadvantages are as follows:

First, when selecting an SL-SSID for use, the transmit-end UE does not include an identifier of the transmit-end UE in the SL-SSID. In addition, other parts of the SL-SSB do not include the identifier of the transmit-end UE, either. Therefore, the receive-end UE cannot determine, by detecting information in the SL-SSB, whether the SL-SSB is from the transmit-end UE that needs to perform beam training with the receive-end UE, and cannot determine whether beam training feedback needs to be performed.

Second, on a Uu interface, neighboring gNBs may choose to use different SSIDs through configuration or negotiation. Therefore, a collision problem does not occur. However, for an SL, a plurality of different transmit-end UEs cannot perform mutual configuration or negotiation to use different SL-SSIDs. Therefore, when an SL-SSID used by the transmit-end UE is the same as an SL-SSID used by another UE, an SL-SSID collision occurs. Even if the receive-end UE knows the SL-SSID used by the transmit-end UE, the receive-end UE cannot determine an SL-SSB to which feedback is performed.

Third, if the transmit-end UE is already in a synchronization state, and is not triggered by the gNB to send an SL-SSB, the transmit-end UE does not send the SL-SSB. In this case, SL-SSB-based beam training cannot be implemented.

In conclusion, because the SL-SSB cannot be used to implement SL beam training, data transmission efficiency on a V2V link is low. To resolve the foregoing technical problems, embodiments of this application provide the following solutions.

Figure 3:
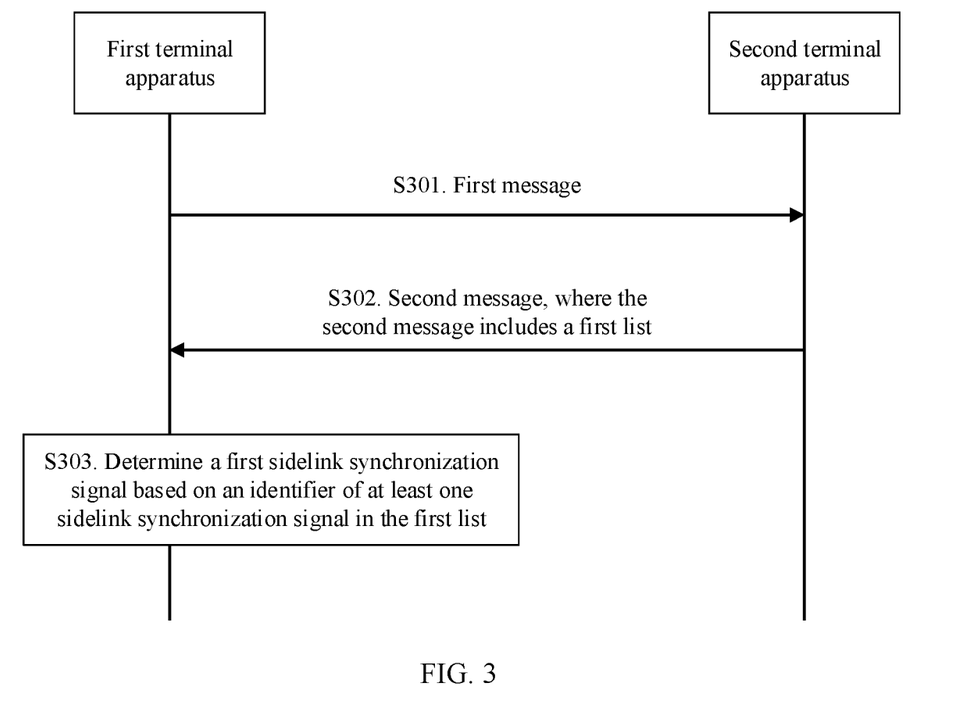
FIG. 3 is a schematic flowchart of a beam training method according to an embodiment of this application.

FIG. 3 is a schematic flowchart of a beam training method according to an embodiment of this application. The method includes but is not limited to the following steps.

S301: A first terminal apparatus sends a first message to a second terminal apparatus, and the second terminal apparatus receives the first message from the second terminal apparatus. The first message is used to request a first list, the first list includes an identifier of at least one sidelink synchronization signal, the at least one sidelink synchronization signal is a sidelink synchronization signal that is not used by the second terminal apparatus within a preset time range and/or that is not used by another terminal apparatus within an area in which the second terminal apparatus is located, and the sidelink synchronization signal includes a primary synchronization signal and a secondary synchronization signal.

The first message may be sidelink control information (SCI), remaining minimum system information (RMSI), a system information block (SIB), a media access control (MAC) control element (CE), PC5 radio resource control (RRC) signaling, or a message defined in another manner. This is not limited herein.

The preset time range may be a predefined time range, a time range defined in a standard, or a time range configured by a network device. The predefined time range may be a time range that is set at delivery of the first terminal apparatus or the second terminal apparatus. The time range defined in the standard may be a time range specified in a protocol or the standard. The time range configured by the network device may be a time range configured by a 5G base station (next generation NodeB, gNB) by using RRC signaling. A unit of the preset time range may be a slot, may be a second or a millisecond, or may be another unit. This is not limited herein. For example, the preset time range may be 160*X ms. X is an integer greater than or equal to 0.

It should be noted that the slot is a time unit used for transmitting uplink information, downlink information, or sidelink information. The slot may include a plurality of mini-slots, and the mini-slot may include one or more orthogonal frequency division multiplexing (OFDM) symbols. Optionally, the slot or the mini-slot is a minimum scheduling unit of sidelink communication or uplink/downlink communication in time domain. For different subcarrier spacings, a quantity of slots included in one frame in 5G communication is also different. A frame is specified as 10 ms. If a normal cyclic prefix (NCP) is used, when a subcarrier spacing is 15 kHz, a 10 ms frame includes 10 slots, and a single slot corresponds to 1 ms; when a subcarrier spacing is 30 kHz, a 10 ms frame includes 20 slots, and a single slot corresponds to 0.5 ms; when a subcarrier spacing is 60 kHz, a 10 ms frame includes 40 slots, and a single slot corresponds to 0.25 ms; or when a subcarrier spacing is 120 kHz, a 10 ms frame includes 80 slots, and a single slot corresponds to 0.125 ms. If an extended cyclic prefix (ECP) is used, only a subcarrier spacing of 60 kHz is supported, a 10 ms frame includes 40 slots, and a single slot corresponds to 0.25 ms.

The first list may include identifiers of one, more, or all sidelink synchronization signals that are not used by the second terminal apparatus within the preset time range and that are not used by another terminal apparatus within an area in which the second terminal apparatus is located. Alternatively, the first list may include identifiers of one, more, or all sidelink synchronization signals that are not used by the second terminal apparatus within the preset time range, or the first list may include identifiers of one, more, or all sidelink synchronization signals that are not used by another terminal apparatus within an area in which the second terminal apparatus is located within the preset time range.

Optionally, a protocol data unit (PDU) corresponding to the first message includes a source identifier of the first terminal apparatus and a target identifier of the second terminal apparatus. Both the source identifier and the target identifier are high-layer identifiers. The second terminal apparatus may determine, based on the source identifier and the target identifier, whether to respond to the first message. Further, when a target identifier of the second terminal apparatus included in the first message is the same as a target identifier stored in the second terminal apparatus, the second terminal apparatus determines that the second terminal apparatus needs to respond to the first message. Then, the second terminal apparatus determines, based on the source identifier of the first terminal apparatus, the first terminal apparatus corresponding to the first message to be responded to. In this case, when a plurality of first terminal apparatuses send the first message to the second terminal apparatus, the second terminal apparatus may know which first terminal apparatus the first message is from.

A channel carrying the first message may be a physical layer sidelink control channel (physical sidelink control channel, PSCCH) or a physical layer sidelink shared channel (physical sidelink shared channel, PSSCH).

Optionally, if the first terminal apparatus sends the first message in a beam form, the first terminal apparatus sends, in a scanning manner by using transmit beams sequentially, the first message in all transmit beam directions supported by the first terminal apparatus.

S302. The second terminal apparatus sends a second message to the first terminal apparatus, and the first terminal apparatus receives the second message from the second terminal apparatus, where the second message includes the first list.

Optionally, a PDU corresponding to the second message includes the source identifier of the first terminal apparatus and the target identifier of the second terminal apparatus. The first terminal apparatus determines, based on the source identifier and the target identifier, whether to respond to the second message. Further, when a source identifier of the first terminal apparatus included in the second message is the same as a source identifier stored in the first terminal apparatus, the first terminal apparatus determines that the first terminal apparatus needs to respond to the second message. Then, the first terminal apparatus determines, based on the target identifier of the first terminal apparatus, the second terminal apparatus corresponding to the second message to be responded to. In this case, when a plurality of second terminal apparatuses send the first message to the first terminal apparatus, the first terminal apparatus may know which second terminal apparatus the second message is from.

A channel carrying the second message may be a PSCCH or a PSSCH. The second message may be SCI, RMSI, a SIB, a MAC CE, PC5-RRC signaling, or another defined message. This is not limited herein.

Optionally, if the second terminal apparatus sends the second message in a beam form, the second terminal apparatus sends, in a scanning manner by using transmit beams sequentially, the second message in all transmit beam directions supported by the second terminal apparatus.

Optionally, if the second terminal apparatus receives first messages from a plurality of different first terminal apparatuses, the second terminal apparatus separately sends, to the plurality of different first terminal apparatuses, second messages including different first lists, so that each first terminal apparatus may select a different SL-SSID based on the different first list included in the second message, thereby avoiding an SL-SSID collision.

For example, second terminal apparatus UE receives first messages of first terminal apparatus UE 1 and first terminal apparatus UE 2, and the second terminal apparatus UE sends second messages including different first lists to the first terminal apparatus UE 1 and the first terminal apparatus UE 2. On the premises that an SL-SSID function is not affected, the second terminal apparatus UE randomly selects 2N SL-SSIDs from SL-SSIDs that are not used by the second terminal apparatus UE and/or SL-SSIDs that are not used by another terminal apparatus in an area in which the second terminal apparatus is located, where N is a positive integer. The second terminal apparatus UE sends N SL-SSIDs in the 2N SL-SSIDs as a first list to the first terminal apparatus UE 1, and sends the other N SL-SSIDs in the 2N SL-SSIDs as another first list to the first terminal apparatus UE 2.

Optionally, a first time window is triggered when the first terminal apparatus sends the first message, and a unit of the first time window is not limited. The first terminal apparatus receives the second message from the second terminal apparatus in the first time window. If the second message is not received in the first time window, the first terminal apparatus may resend the first message to the second terminal apparatus and trigger the first time window until the second message is received. If a quantity of times the first terminal apparatus repeatedly sends the first message exceeds a preset threshold but the second message is still not received, the first terminal apparatus notifies a higher layer entity, where the higher layer entity may be a radio resource control (RRC) layer.

S303. The first terminal apparatus determines the first sidelink synchronization signal based on the identifier of the at least one sidelink synchronization signal in the first list, where the first sidelink synchronization signal is used for beam training.

In a specific implementation, the first sidelink synchronization signal may correspond to identifiers of one or more sidelink synchronization signals. The first terminal apparatus may determine a first SL-SSB set based on the first sidelink synchronization signal. A sidelink synchronization signal block in the first SL-SSB set includes the first sidelink synchronization signal, and the first SL-SSB set is used for beam training. Then, the first terminal apparatus sends the first SL-SSB set of one or more periodicities to the second terminal apparatus, where the first SL-SSB set corresponds to a set of all transmit beam directions supported by the first terminal apparatus. The second terminal apparatus receives and measures the first SL-SSB set of one or more periodicities from the first terminal apparatus, to obtain a reference signal received power of each SL-SSB in the first SL-SSB set, and performs feedback. The second terminal apparatus may determine an optimal receive beam and an optimal transmit beam based on the reference signal received power, and perform feedback. Finally, the first terminal apparatus receives a beam training feedback from the first terminal apparatus.

Further, if the first list includes one SL-SSID, the first terminal apparatus may determine the SL-SSID as the identifier of the first sidelink synchronization signal. If the first list includes a plurality of SL-SSIDs, the first terminal apparatus may select the identifier of the first sidelink synchronization signal from the first list. Then, the first terminal apparatus determines the first sidelink synchronization signal based on the identifier of the first sidelink synchronization signal.

Optionally, when the first list includes one or more SL-SSIDs, after determining the identifier of the first sidelink synchronization signal, the first terminal apparatus may send a third message to the second terminal apparatus. The third message includes the identifier of the first sidelink synchronization signal, and the third message is used to notify the second terminal apparatus that the first sidelink synchronization signal is determined based on the identifier of the first sidelink synchronization signal. Optionally, when the first list includes only one SL-SSID, the first terminal apparatus does not need to select the SL-SSID from the first list, and therefore may not send the third message.

Optionally, a PDU corresponding to the third message includes the source identifier of the first terminal apparatus and the target identifier of the second terminal apparatus.

The second terminal apparatus determines, based on the source identifier and the target identifier, whether to respond to the third message. Further, when a target identifier of the second terminal apparatus included in the first message is the same as a target identifier stored in the second terminal apparatus, the second terminal apparatus determines that the third message needs to be responded to. Then, the second terminal apparatus determines, based on the source identifier of the first terminal apparatus, the first terminal apparatus corresponding to the third message to be responded to. Descriptions of the third message are similar to those of the first message, and details are not described herein again.

A channel carrying the third message may be a PSCCH or a PSSCH. The third message may be SCI, RMSI, a SIB, a MAC CE, PC5-RRC signaling, or another defined message. This is not limited herein. If the first terminal apparatus sends the third message in a beam form, the first terminal apparatus sends, in a scanning manner by using transmit beams sequentially, the third message in all transmit beam directions supported by the first terminal apparatus.

Optionally, a second time window is triggered when the second terminal apparatus sends the second message, and a unit of the first time window is not limited. The second terminal apparatus receives the third message from the first terminal apparatus in the second time window. If the third message is not received in the second time window, the second terminal apparatus may resend the second message to the first terminal apparatus and trigger the second time window until the third message is received. If a quantity of times the second terminal apparatus repeatedly sends the second message exceeds a preset threshold and the third message is not received, the second terminal apparatus notifies a higher layer entity (for example, the RRC).

Optionally, after the first terminal apparatus determines the identifier of the first sidelink synchronization signal, the first terminal apparatus may send a fourth message. The fourth message may include the identifier of the first sidelink synchronization signal, and a PDU corresponding to the fourth message may not include the source identifier of the first terminal apparatus or the target identifier of the second terminal apparatus. The fourth message is used to notify all terminal apparatuses in an area in which the first terminal apparatus is located that the identifier of the first sidelink synchronization signal has been used. The fourth message is a multicast message or a broadcast message. All terminal apparatuses in a multicast or broadcast range may receive the fourth message, and the second terminal apparatus may also receive the fourth message, so that all terminal apparatuses that receive the fourth message no longer generate a sidelink synchronization signal based on the identifier of the first sidelink synchronization signal within the preset time range, thereby avoiding an SL-SSID collision.

In this embodiment of this application, the first terminal apparatus and the second terminal apparatus obtain an available SL-SSID through negotiation. The second terminal apparatus is capable of determining, based on the SL-SSID, SL-SSBs from the first terminal apparatus that performs beam training with the second terminal apparatus, and performing beam training feedback on the received SL-SSBs. Because different SL-SSIDs are used, an SL-SSID collision is avoided. In addition, the first terminal apparatus triggers SL-SSB sending to implement SL beam training, and then performs data transmission by using a trained beam, so that data transmission efficiency is improved.

Figure 4:
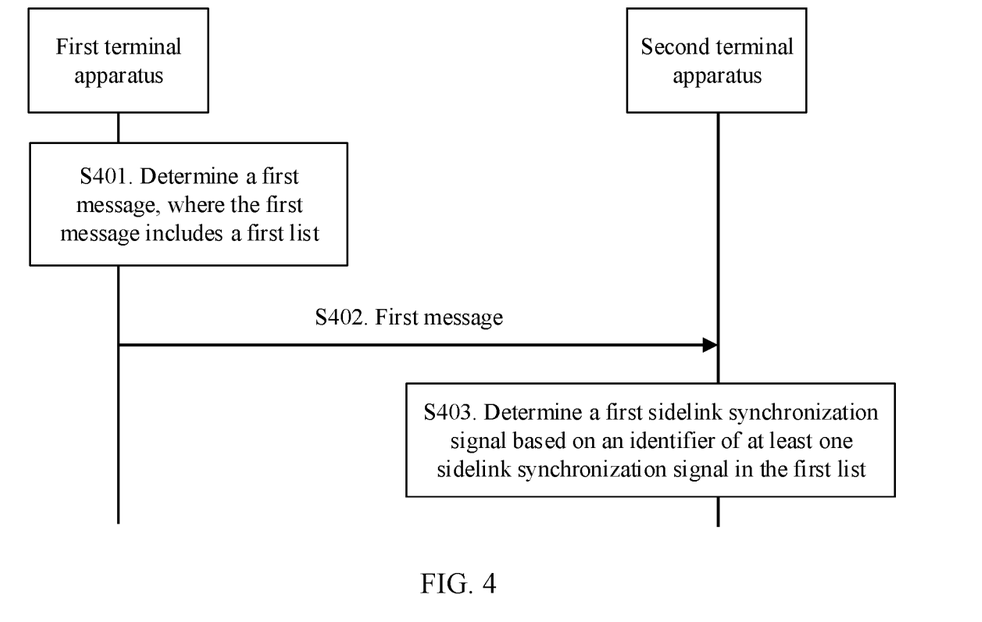
FIG. 4 is a schematic flowchart of another beam training method according to an embodiment of this application.

FIG. 4 is a schematic flowchart of another beam training method according to an embodiment of this application. The method includes but is not limited to the following steps.

S401. A first terminal apparatus determines a first message, where the first message includes a first list, the first list includes an identifier of at least one sidelink synchronization signal, the at least one sidelink synchronization signal is a sidelink synchronization signal that is not used by the first terminal apparatus within a preset time range and/or that is not used by another terminal apparatus within an area in which the first terminal apparatus is located, and the sidelink synchronization signal includes a primary synchronization signal and a secondary synchronization signal, and the at least one sidelink synchronization signal is used for beam training.

The first message may be SCI, RMSI, a SIB, a MAC CE, PC5-RRC signaling, or another defined message. This is not limited herein.

The preset time range may be a predefined time range, a time range defined in a standard, or a time range configured by a network device. The predefined time range may be a time range that is set at delivery of the first terminal apparatus or the second terminal apparatus. The time range defined in the standard may be a time range specified in a protocol or the standard. The time range configured by the network device may be a time range configured by the 5G base station by using RRC signaling. A unit of the preset time range may be a slot, may be a second or a millisecond, or may be another unit. This is not limited herein. For example, the preset time range may be 160*X ms. X is an integer greater than or equal to 0.

The first list may include identifiers of one, more, or all sidelink synchronization signals that are not used by the first terminal apparatus within the preset time range and that are not used by another terminal apparatus in an area in which the first terminal apparatus is located. Alternatively, the first list may include identifiers of one, more, or all sidelink synchronization signals that are not used by the first terminal apparatus within the preset time range, or the first list may include identifiers of one, more, or all sidelink synchronization signals that are not used by another terminal apparatus within an area in which the first terminal apparatus is located within the preset time range.

Optionally, a PDU corresponding to the first message may include a source identifier of the first terminal apparatus and a target identifier of the second terminal apparatus. Both the source identifier and the target identifier are high-layer identifiers. The second terminal apparatus may determine, based on the source identifier and the target identifier, whether to respond to the first message. Further, when a target identifier of the second terminal apparatus included in the first message is the same as a target identifier stored in the second terminal apparatus, the second terminal apparatus determines that the second terminal apparatus needs to respond to the first message. Then, the second terminal apparatus determines, based on the source identifier of the first terminal apparatus, the first terminal apparatus corresponding to the first message to be responded to. In this case, when a plurality of first terminal apparatuses send the first message to the second terminal apparatus, the second terminal apparatus may know which first terminal apparatus the first message is from.

A channel carrying the first message may be a PSCCH or a PSSCH.

S402. The first terminal apparatus sends the first message to the second terminal apparatus, and the second terminal apparatus receives the first message from the first terminal apparatus.

In a specific implementation, if the first terminal apparatus sends the first message in a beam form, the first terminal apparatus sends, in a scanning manner by using transmit beams sequentially, the first message in all transmit beam directions supported by the first terminal apparatus. The first message is used to indicate the second terminal apparatus to send an SL-SSB, to perform SL beam training.

Optionally, the first terminal apparatus may separately send, to a plurality of different second terminal apparatuses, first messages including different first lists, so that each second terminal apparatus may select a different SL-SSID based on the different first list included in the first message, thereby avoiding an SL-SSID collision.

S403. The second terminal apparatus determines a first sidelink synchronization signal based on the identifier of the at least one sidelink synchronization signal in the first list, where the first sidelink synchronization signal is used for beam training.

In a specific implementation, the first sidelink synchronization signal may correspond to identifiers of one or more sidelink synchronization signals. The second terminal apparatus may determine a first SL-SSB set based on the first sidelink synchronization signal. A sidelink synchronization signal block in the first SL-SSB set includes the first sidelink synchronization signal, and the first SL-SSB set is used for beam training. Then, the second terminal apparatus sends the first SL-SSB set of one or more periodicities to the first terminal apparatus, where the first SL-SSB set corresponds to a set of all transmit beam directions supported by the second terminal apparatus. The first terminal apparatus receives and measures the first SL-SSB set of one or more periods from the second terminal apparatus, to obtain a reference signal received power of each SL-SSB in the first SL-SSB set. The first terminal apparatus may determine an optimal receive beam and an optimal transmit beam based on the reference signal received power, and perform feedback. Finally, the second terminal apparatus receives a beam training feedback from the first terminal apparatus.

Further, if the first list includes one SL-SSID, the second terminal apparatus may determine the SL-SSID as the identifier of the first sidelink synchronization signal. If the first list includes a plurality of SL-SSIDs, the second terminal apparatus may select the identifier of the first sidelink synchronization signal from the first list. Then, the second terminal apparatus determines the first sidelink synchronization signal based on the identifier of the first sidelink synchronization signal.

Optionally, when the first list includes one or more SL-SSIDs, after determining the identifier of the first sidelink synchronization signal, the second terminal apparatus may send a second message to the first terminal apparatus. The second message includes the identifier of the first sidelink synchronization signal, and the second message is used to notify the first terminal apparatus that the first sidelink synchronization signal is determined based on the identifier of the first sidelink synchronization signal. Optionally, when the first list includes only one SL-SSID, the second terminal apparatus does not need to select the SL-SSID from the first list, and therefore may not send the second message.

Optionally, a PDU corresponding to the second message includes the source identifier of the first terminal apparatus and the target identifier of the second terminal apparatus. The first terminal apparatus determines, based on the source identifier and the target identifier, whether to respond to the second message. Further, when a source identifier of the first terminal apparatus included in the second message is the same as a source identifier stored in the second terminal apparatus, the first terminal apparatus determines that the second message needs to be responded to. Then, the first terminal apparatus determines, based on the target identifier of the second terminal apparatus, the second terminal apparatus corresponding to the second message to be responded to. Descriptions of the second message are similar to those of the first message, and details are not described herein again.

A channel carrying the second message may be a PSCCH or a PSSCH. The second message may be SCI, RMSI, a SIB, a MAC CE, PC5-RRC signaling, or another defined message. This is not limited herein. If the second terminal apparatus sends the second message in a beam form, the second terminal apparatus sends, in a scanning manner by using transmit beams sequentially, the second message in all transmit beam directions supported by the second terminal apparatus.

Optionally, a first time window is triggered when the first terminal apparatus sends the first message, and a unit of the first time window is not limited. The first terminal apparatus may receive the second message from the second terminal apparatus in the first time window. If the second message is not received in the first time window, the first terminal apparatus may resend the first message to the second terminal apparatus and trigger the first time window until the second message is received. If a quantity of times the first terminal apparatus repeatedly sends the first message exceeds a preset threshold and the second message is not received, the first terminal apparatus notifies a higher layer entity (for example, the RRC).

Optionally, after the second terminal apparatus determines the identifier of the first sidelink synchronization signal, the second terminal apparatus may send a third message. The third message may include the identifier of the first sidelink synchronization signal, and a PDU corresponding to the third message may not include the source identifier of the first terminal apparatus or the target identifier of the second terminal apparatus. The third message is used to notify all terminal apparatuses in an area in which the second terminal apparatus is located that the identifier of the first sidelink synchronization signal has been used. The third message is a multicast message or a broadcast message. All terminal apparatuses in a multicast or broadcast range may receive the third message, and the first terminal apparatus may also receive the third message, so that all terminal apparatuses that receive the third message no longer generate a sidelink synchronization signal based on the identifier of the first sidelink synchronization signal within the preset time range, thereby avoiding an SL-SSID collision.

In this embodiment of this application, the first terminal apparatus and the second terminal apparatus obtain an available SL-SSID through negotiation. The first terminal apparatus is capable of determining, based on the SL-SSID, SL-SSBs from the second terminal apparatus that performs beam training with the first terminal apparatus, and performing beam training feedback on the received SL-SSBs. Because different SL-SSIDs are used, an SL-SSID collision is avoided. In addition, the second terminal apparatus triggers SL-SSB sending to implement SL beam training, and then performs data transmission by using a trained beam, so that data transmission efficiency is improved.

The foregoing describes in detail the method in embodiments of this application. The following provides apparatuses in embodiments of this application.

Figure 5:
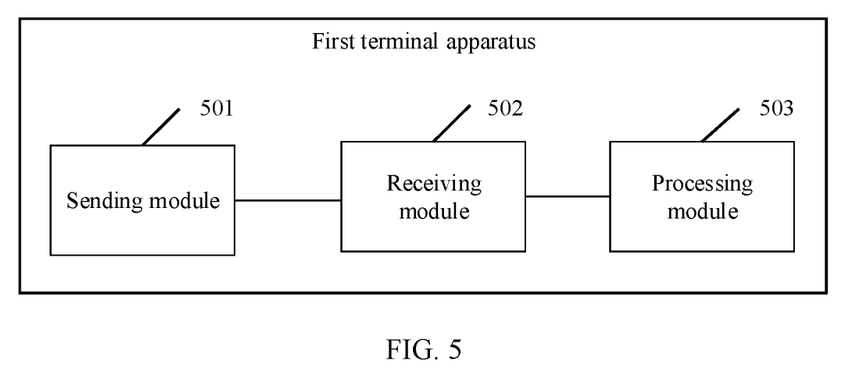
FIG. 5 is a schematic structural diagram of a first terminal apparatus according to an embodiment of this application.

FIG. 5 is a schematic structural diagram of a first terminal apparatus according to an embodiment of this application. The first terminal apparatus may include a sending module

501, a receiving module 502, and a processing module 503. Detailed descriptions of the modules are as follows:

In an embodiment, the sending module 501 is configured to send a first message to a second terminal apparatus, where the first message is used to request a first list, the first list includes an identifier of at least one sidelink synchronization signal, the at least one sidelink synchronization signal is a sidelink synchronization signal that is not used by the second terminal apparatus within a preset time range and/or that is not used by another terminal apparatus within an area in which the second terminal apparatus is located, and the sidelink synchronization signal includes a primary synchronization signal and a secondary synchronization signal.

The receiving module 502 is configured to receive a second message from the second terminal apparatus, where the second message includes the first list.

The processing module 503 is configured to determine a first sidelink synchronization signal based on the identifier of the at least one sidelink synchronization signal in the first list, where the first sidelink synchronization signal is used for beam training.

Optionally, the processing module 503 is further configured to determine a first sidelink synchronization signal block set based on the first sidelink synchronization signal, where a sidelink synchronization signal block in the first sidelink synchronization signal block set includes the first sidelink synchronization signal; and the first sidelink synchronization signal block set is used for beam training.

Optionally, the processing module 503 is further configured to: select an identifier of the first sidelink synchronization signal from the first list; and determine the first sidelink synchronization signal based on the identifier of the first sidelink synchronization signal.

Optionally, the sending module 501 is further configured to send a third message to the second terminal apparatus, where the third message includes the identifier of the first sidelink synchronization signal, and the third message is used to notify the second terminal apparatus that the first sidelink synchronization signal is determined based on the identifier of the first sidelink synchronization signal.

Optionally, the sending module 501 is further configured to send a fourth message, where the fourth message includes the identifier of the first sidelink synchronization signal, and the fourth message is used to notify all terminal apparatuses in the area in which the first terminal apparatus is located that the identifier of the first sidelink synchronization signal has been used.

Optionally, the receiving module 502 is further configured to receive the second message from the second terminal apparatus in the first time window.

In another embodiment, the processing module 503 is further configured to determine a first message, where the first message includes a first list, the first list includes an identifier of at least one sidelink synchronization signal, the at least one sidelink synchronization signal is a sidelink synchronization signal that is not used by the first terminal apparatus within a preset time range and/or that is not used by another terminal apparatus within an area in which the first terminal apparatus is located, the sidelink synchronization signal includes a primary synchronization signal and a secondary synchronization signal, and the at least one sidelink synchronization signal is used for beam training.

The sending module 501 is configured to send the first message to a second terminal apparatus.

Optionally, the receiving module 502 is configured to receive a second message from the second terminal apparatus, where the second message includes an identifier of a first sidelink synchronization signal in the first list, and the second message is used to notify the first terminal apparatus that the first sidelink synchronization signal is determined based on the identifier of the first sidelink synchronization signal.

The first sidelink synchronization signal is used to determine a first sidelink synchronization signal block set, a sidelink synchronization signal block in the first sidelink synchronization signal block set includes the first sidelink synchronization signal, and the first sidelink synchronization signal block set is used for beam training.

Optionally, the receiving module 502 is further configured to receive the second message from the second terminal apparatus in a first time window.

It should be noted that, for implementation of each module, refer to corresponding descriptions of the method embodiment shown in FIG. 3 or FIG. 4, and the module performs the methods and the functions performed by the first terminal apparatus in the foregoing embodiments.

Figure 6:
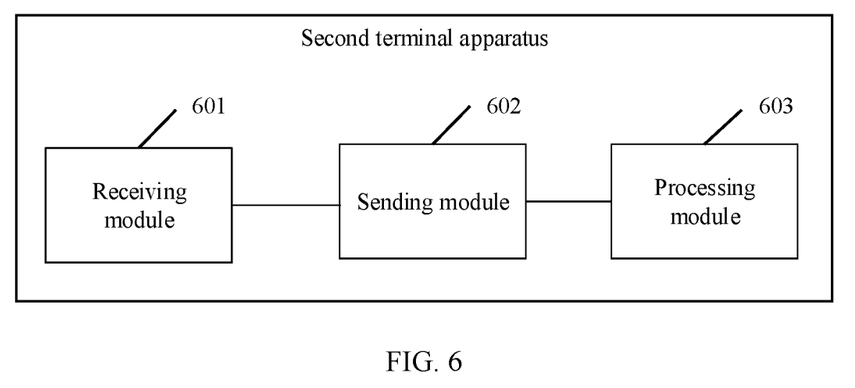
FIG. 6 is a schematic structural diagram of a second terminal apparatus according to an embodiment of this application.

FIG. 6 is a schematic structural diagram of a second terminal apparatus according to an embodiment of this application. The second terminal apparatus may include a receiving module 601, a sending module 602, and a processing module 603. Detailed descriptions of the modules are as follows:

In an embodiment, the receiving module 601 is configured to receive a first message from a first terminal apparatus, where the first message is used to request a first list, the first list includes an identifier of at least one sidelink synchronization signal, the at least one sidelink synchronization signal is a sidelink synchronization signal that is not used by the second terminal apparatus within a preset time range and/or that is not used by another terminal apparatus within an area in which the second terminal apparatus is located, and the sidelink synchronization signal includes a primary synchronization signal and a secondary synchronization signal, and the at least one sidelink synchronization signal is used for beam training.

The sending module 602 is configured to send a second message to the first terminal apparatus, where the second message includes the first list.

Optionally, the receiving module 601 is further configured to receive a third message from the first terminal apparatus, where the third message includes an identifier of a first sidelink synchronization signal in the first list, and the third message is used to notify the second terminal apparatus that the first sidelink synchronization signal is determined based on the identifier of the first sidelink synchronization signal.

The first sidelink synchronization signal is used to determine a first sidelink synchronization signal block set, a sidelink synchronization signal block in the first sidelink synchronization signal block set includes the first sidelink synchronization signal, and the first sidelink synchronization signal block set is used for beam training.

Optionally, the receiving module 601 is further configured to receive the third message from the first terminal apparatus in a second time window.

In another embodiment, the receiving module 601 is configured to receive a first message from a first terminal apparatus, where the first message includes a first list, the first list includes an identifier of at least one sidelink synchronization signal, the at least one sidelink synchronization signal is a sidelink synchronization signal that is not used by the first terminal apparatus within a preset time range and/or that is not used by another terminal apparatus within an area in which the first terminal apparatus is located, and the sidelink synchronization signal includes a primary synchronization signal and a secondary synchronization signal.

The processing module 603 is configured to determine a first sidelink synchronization signal based on the identifier of the at least one sidelink synchronization signal in the first list, where the first sidelink synchronization signal is used for beam training.

Optionally, the processing module 603 is further configured to determine a first sidelink synchronization signal block set based on the first sidelink synchronization signal, where a sidelink synchronization signal block in the first sidelink synchronization signal block set includes the first sidelink synchronization signal; and the first sidelink synchronization signal block set is used for beam training.

Optionally, the processing module 603 is further configured to: select an identifier of the first sidelink synchronization signal from the first list; and determine the first sidelink synchronization signal based on the identifier of the first sidelink synchronization signal.

Optionally, the sending module 602 is configured to send a second message to the first terminal apparatus, where the second message includes the identifier of the first sidelink synchronization signal, and the second message is used to notify the first terminal apparatus that the first sidelink synchronization signal is determined based on the identifier of the first sidelink synchronization signal.

Optionally, the sending module 602 is further configured to send a third message, where the third message includes the identifier of the first sidelink synchronization signal, and the third message is used to notify all terminal apparatuses within an area in which the second terminal apparatus is located that the identifier of the first sidelink synchronization signal has been used.

It should be noted that, for implementation of each module, refer to corresponding descriptions of the method embodiment shown in FIG. 3 or FIG. 4, and the module performs the methods and the functions performed by the second terminal apparatus in the foregoing embodiments.

Figure 7:
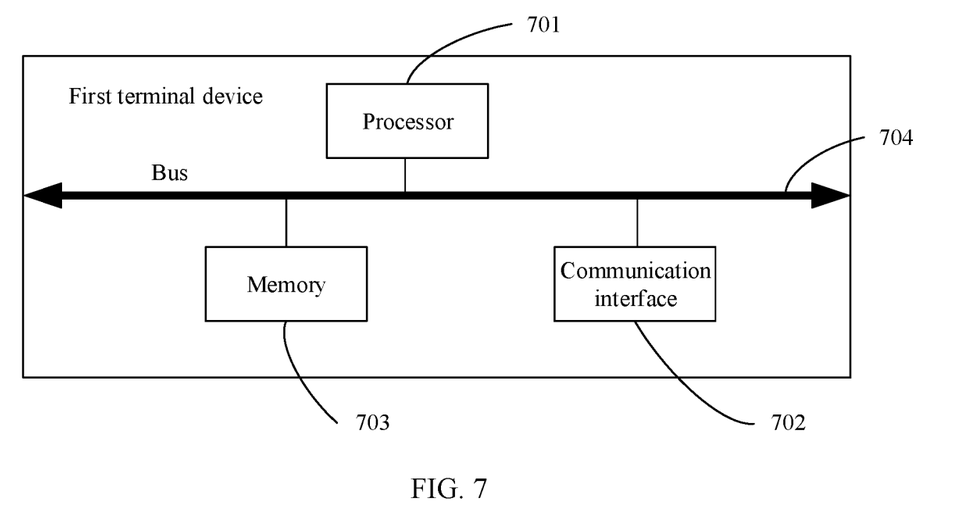
FIG. 7 is a schematic structural diagram of a first terminal device according to an embodiment of this application.

FIG. 7 is a schematic structural diagram of a first terminal device according to an embodiment of this application. As shown in FIG. 7, the first terminal device may include at least one processor 701, at least one communication interface 702, at least one memory 703, and at least one communication bus 704.

The processor 701 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. The processor may alternatively be a combination for implementing a computing function, for example, a combination including one or more microprocessors, or a combination of a digital signal processor and a microprocessor. The communication bus 704 may be a peripheral component interconnect PCI bus, an extended industry standard architecture EISA bus, or the like. The bus may be classified into an address bus, a data bus, a control bus, and the like. For ease of representation, only one bold line is used for representation in FIG. 7, but this does not mean that there is only one bus or only one type of bus. The communication bus 704 is configured to implement connection and communication between these components. The communication interface 702 of the device in this embodiment of this application is configured to perform signaling or data communication with another node device. The memory 703 may include a volatile memory, for example, a nonvolatile random access memory (NVRAM), a phase-change random access memory (phase-change RAM, PRAM), or a magneto-resistive random access memory (magneto-resistive RAM, MRAM). The memory may further include a nonvolatile memory, for example, at least one magnetic disk storage device, an electrically erasable programmable read-only memory (EEPROM), a flash storage device such as a NOR flash memory or a NAND flash memory, or a semiconductor device such as a solid-state drive (SSD). Optionally, the memory 703 may alternatively be at least one storage apparatus that is away from the processor 701. Optionally, the memory 703 may further store a set of program code, and the processor 701 may optionally further execute a program executed in the memory 703.

In an embodiment, the processor is configured to send a first message to a second terminal apparatus, where the first message is used to request a first list, the first list includes an identifier of at least one sidelink synchronization signal, the at least one sidelink synchronization signal is a sidelink synchronization signal that is not used by the second terminal apparatus within a preset time range and/or that is not used by another terminal apparatus within an area in which the second terminal apparatus is located, and the sidelink synchronization signal includes a primary synchronization signal and a secondary synchronization signal;

receive a second message from the second terminal apparatus, where the second message includes the first list; and determine a first sidelink synchronization signal based on the identifier of the at least one sidelink synchronization signal in the first list, where the first sidelink synchronization signal is used for beam training.

Optionally, the processor 701 is further configured to:
determine a first sidelink synchronization signal block set based on the first sidelink synchronization signal, where a sidelink synchronization signal block in the first sidelink synchronization signal block set includes the first sidelink synchronization signal; and the first sidelink synchronization signal block set is used for beam training.

Optionally, the processor 701 is further configured to:
select an identifier of the first sidelink synchronization signal from the first list; and determine the first sidelink synchronization signal based on the identifier of the first sidelink synchronization signal.

Optionally, the processor 701 is further configured to:
send a third message to the second terminal apparatus, where the third message includes the identifier of the first sidelink synchronization signal, and the third message is used to notify the second terminal apparatus that the first sidelink synchronization signal is determined based on the identifier of the first sidelink synchronization signal.

Optionally, the processor 701 is further configured to:
send a fourth message, where the fourth message includes the identifier of the first sidelink synchronization signal, and the fourth message is used to notify all terminal apparatuses within an area in which the first terminal apparatus is located that the identifier of the first sidelink synchronization signal has been used.

Optionally, the processor 701 is further configured to:

receive the second message from the second terminal apparatus in the first time window.

In another embodiment, the processor is configured to: determine a first message, where the first message includes a first list, the first list includes an identifier of at least one sidelink synchronization signal, the at least one sidelink synchronization signal is a sidelink synchronization signal that is not used by the first terminal apparatus within a preset time range and/or that is not used by another terminal apparatus within an area in which the first terminal apparatus is located, the sidelink synchronization signal includes a primary synchronization signal and a secondary synchronization signal, and the at least one sidelink synchronization signal is used for beam training; and send the first message to a second terminal apparatus.

Optionally, the processor 701 is further configured to:

receive a second message from the second terminal apparatus, where the second message includes an identifier of a first sidelink synchronization signal in the first list, and the second message is used to notify the first terminal apparatus that the first sidelink synchronization signal is determined based on the identifier of the first sidelink synchronization signal.

The first sidelink synchronization signal is used to determine a first sidelink synchronization signal block set, a sidelink synchronization signal block in the first sidelink synchronization signal block set includes the first sidelink synchronization signal, and the first sidelink synchronization signal block set is used for beam training.

Optionally, the processor 701 is further configured to:

receive the second message from the second terminal apparatus in a first time window.

Further, the processor may further cooperate with the memory and the communication interface to perform operations of the first terminal apparatus in the foregoing embodiments of this application.

Figure 8:
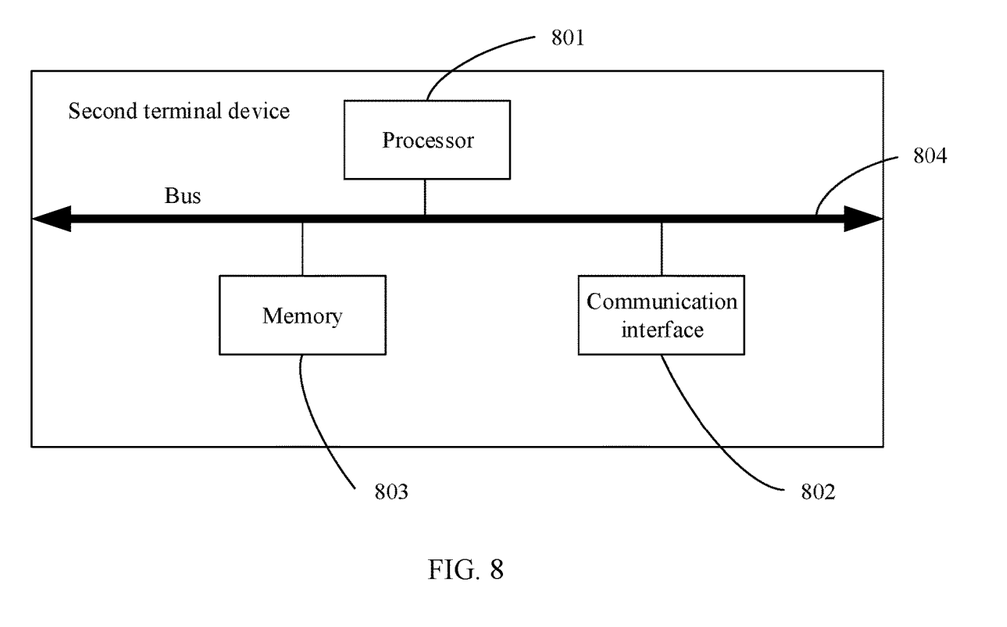
FIG. 8 is a schematic structural diagram of a second terminal device according to an embodiment of this application.

FIG. 8 is a schematic structural diagram of a second terminal device according to an embodiment of this application. As shown in the figure, the second terminal device may include at least one processor 801, at least one communication interface 802, at least one memory 803, and at least one communication bus 804.

The processor 801 may be the various types of processors described above. The communication bus 804 may be a peripheral component interconnect PCI bus, an extended industry standard architecture EISA bus, or the like. The bus may be classified into an address bus, a data bus, a control bus, and the like. For ease of representation, only one thick line is used for representation in FIG. 8, but this does not mean that there is only one bus or only one type of bus. The communication bus 804 is configured to implement communication connection between these components. The communication interface 802 of the device in this embodiment of this application is configured to perform signaling or data communication with another node device. The memory 803 may be the various types of memories described above. Optionally, the memory 803 may alternatively be at least one storage apparatus that is away from the processor 801. The memory 803 stores a set of program code, and the processor 801 executes a program in the memory 803.

In an embodiment, the processor is configured to: receive a first message from a first terminal apparatus, where the first message is used to request a first list, the first list includes an identifier of at least one sidelink synchronization signal, the at least one sidelink synchronization signal is a sidelink synchronization signal that is not used by the second terminal apparatus within a preset time range and/or that is not used by another terminal apparatus within an area in which the second terminal apparatus is located, the sidelink synchronization signal includes a primary synchronization signal and a secondary synchronization signal, and the at least one sidelink synchronization signal is used for beam training; and send a second message to the first terminal apparatus, where the second message includes the first list.

Optionally, the processor 801 is further configured to:

receive a third message from the first terminal apparatus, where the third message includes an identifier of a first sidelink synchronization signal in the first list, and the third message is used to notify the second terminal apparatus that the first sidelink synchronization signal is determined based on the identifier of the first sidelink synchronization signal.

The first sidelink synchronization signal is used to determine a first sidelink synchronization signal block set, a sidelink synchronization signal block in the first sidelink synchronization signal block set includes the first sidelink synchronization signal, and the first sidelink synchronization signal block set is used for beam training.

Optionally, the processor 801 is further configured to:

receive the third message from the first terminal apparatus in a second time window.

Optionally, the processor 801 is further configured to:

send a third message, where the third message includes the identifier of the first sidelink synchronization signal, and the third message is used to notify all terminal apparatuses within an area in which the second terminal apparatus is located that the identifier of the first sidelink synchronization signal has been used.

In another embodiment, the processor is configured to: receive a first message from a first terminal apparatus, where the first message includes a first list, the first list includes an identifier of at least one sidelink synchronization signal, the at least one sidelink synchronization signal is a sidelink synchronization signal that is not used by the first terminal apparatus within a preset time range and/or that is not used by another terminal apparatus within an area in which the first terminal apparatus is located, and the sidelink synchronization signal includes a primary synchronization signal and a secondary synchronization signal; and determine a first sidelink synchronization signal based on the identifier of the at least one sidelink synchronization signal in the first list, where the first sidelink synchronization signal is used for beam training.

Optionally, the processor 801 is further configured to:

determine a first sidelink synchronization signal block set based on the first sidelink synchronization signal, where a sidelink synchronization signal block in the first sidelink synchronization signal block set includes the first sidelink synchronization signal; and the first sidelink synchronization signal block set is used for beam training.

Optionally, the processor 801 is further configured to:

select an identifier of the first sidelink synchronization signal from the first list; and determine the first sidelink synchronization signal based on the identifier of the first sidelink synchronization signal.

Optionally, the processor 801 is further configured to:

send a second message to the first terminal apparatus, where the second message includes the identifier of the first sidelink synchronization signal, and the second message is used to notify the first terminal apparatus that the first sidelink synchronization signal is determined based on the identifier of the first sidelink synchronization signal.

Further, the processor may further cooperate with the memory and the communication interface to perform operations of the second terminal apparatus in the foregoing embodiments of this application.

An embodiment of this application further provides a chip system. The chip system includes a processor, configured to support a first terminal apparatus or a second terminal apparatus in implementing a function in any one of the foregoing embodiments, for example, generating or processing data and/or information in the foregoing methods. In a possible design, the chip system may further include a memory, and the memory is used to store program instructions and data that are necessary for the first terminal apparatus or the second terminal apparatus. The chip system may include a chip, or may include a chip and another discrete component.

An embodiment of this application further provides a processor, configured to be coupled to a memory, and configured to perform any method and function performed by the first terminal apparatus or the second terminal apparatus in any one of the foregoing embodiments.

An embodiment of this application further provides a computer program product. When the computer program product runs on a computer, the computer is enabled to perform any method and function performed by the first terminal apparatus or the second terminal apparatus in any one of the foregoing embodiments.

An embodiment of this application further provides a communication apparatus, including at least one processor, configured to invoke an instruction from a memory and run the instruction, to enable the communication apparatus to perform any method and function related to the first terminal apparatus or the second terminal apparatus in any one of the foregoing embodiments. The memory may belong to the communication apparatus, or may be disposed outside the communication apparatus.

An embodiment of this application further provides a communication system. The system includes at least one first terminal apparatus and at least one second terminal apparatus in any one of the foregoing embodiments.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid-state drive (SSD)), or the like.

The objectives, technical solutions, and beneficial effects of this application are further described in detail in the foregoing specific implementations. Any modification, equivalent replacement, or improvement made without departing from the spirit and principle of this application shall fall within the protection scope of this application.

What is claimed is:

1. A beam training method, wherein the beam training method comprises:
    sending, by a first terminal apparatus, a first message to a second terminal apparatus, wherein the first message serves as a request for a first list, the first list comprises an identifier of at least one sidelink synchronization signal, the at least one sidelink synchronization signal is a sidelink synchronization signal that is not used by at least one of the second terminal apparatus within a preset time range or another terminal apparatus within an area in which the second terminal apparatus is located, and the sidelink synchronization signal comprises a primary synchronization signal and a secondary synchronization signal;
    receiving, by the first terminal apparatus, a second message from the second terminal apparatus, wherein the second message comprises the first list; and
    determining, by the first terminal apparatus, a first sidelink synchronization signal based on the identifier of the at least one sidelink synchronization signal in the first list, wherein the first sidelink synchronization signal is used for beam training.

2. The beam training method according to claim 1, wherein the beam training method further comprises:
    determining, by the first terminal apparatus, a first sidelink synchronization signal block set based on the first sidelink synchronization signal, wherein a sidelink synchronization signal block in the first sidelink synchronization signal block set comprises the first sidelink synchronization signal; and
    wherein the first sidelink synchronization signal is used for beam training comprises:
        the first sidelink synchronization signal block set is used for beam training.

3. The beam training method according to claim 1, wherein the determining, by the first terminal apparatus, a first sidelink synchronization signal based on the identifier of the at least one sidelink synchronization signal in the first list comprises:
    selecting, by the first terminal apparatus, an identifier of the first sidelink synchronization signal from the first list; and
    determining, by the first terminal apparatus, the first sidelink synchronization signal based on the identifier of the first sidelink synchronization signal.

4. The beam training method according to claim 3, wherein the beam training method further comprises:
    sending, by the first terminal apparatus, a third message to the second terminal apparatus, wherein the third message comprises the identifier of the first sidelink synchronization signal, and the third message notifies the second terminal apparatus that the first sidelink synchronization signal is determined based on the identifier of the first sidelink synchronization signal.

5. The beam training method according to claim 3, wherein the beam training method further comprises:
sending, by the first terminal apparatus, a fourth message, wherein the fourth message comprises the identifier of the first sidelink synchronization signal, and the fourth message notifies all terminal apparatuses within an area in which the first terminal apparatus is located that the identifier of the first sidelink synchronization signal has been used.

6. The beam training method according to claim 1, wherein the receiving, by the first terminal apparatus, a second message from the second terminal apparatus comprises:
receiving, by the first terminal apparatus, the second message from the second terminal apparatus in a first time window.

7. A beam training method, wherein the beam training method comprises:
receiving, by a second terminal apparatus, a first message from a first terminal apparatus, wherein the first message serves as a request for a first list, the first list comprises an identifier of at least one sidelink synchronization signal, the at least one sidelink synchronization signal is a sidelink synchronization signal that is not used by at least one of the second terminal apparatus within a preset time range or another terminal apparatus within an area in which the second terminal apparatus is located, the sidelink synchronization signal comprises a primary synchronization signal and a secondary synchronization signal, and the at least one sidelink synchronization signal is used for beam training; and
sending, by the second terminal apparatus, a second message to the first terminal apparatus, wherein the second message comprises the first list.

8. The beam training method according to claim 7, wherein the beam training method further comprises:
receiving, by the second terminal apparatus, a third message from the first terminal apparatus, wherein the third message comprises an identifier of a first sidelink synchronization signal in the first list, and the third message notifies the second terminal apparatus that the first sidelink synchronization signal is determined based on the identifier of the first sidelink synchronization signal.

9. The beam training method according to claim 8, wherein the first sidelink synchronization signal is used to determine a first sidelink synchronization signal block set, a sidelink synchronization signal block in the first sidelink synchronization signal block set comprises the first sidelink synchronization signal, and the first sidelink synchronization signal block set is used for beam training.

10. The beam training method according to claim 8, wherein the receiving, by the second terminal apparatus, a third message from the first terminal apparatus comprises:
receiving, by the second terminal apparatus, the third message from the first terminal apparatus in a second time window.

11. A first terminal apparatus, wherein the first terminal apparatus comprises:
at least one processor; and
one or more memories coupled to the at least one processor and storing program instructions for execution by the at least one processor to:
send a first message to a second terminal apparatus, wherein the first message serves as a request for a first list, the first list comprises an identifier of at least one sidelink synchronization signal, the at least one sidelink synchronization signal is a sidelink synchronization signal that is not used by at least one of the second terminal apparatus within a preset time range or another terminal apparatus within an area in which the second terminal apparatus is located, and the sidelink synchronization signal comprises a primary synchronization signal and a secondary synchronization signal;
receive a second message from the second terminal apparatus, wherein the second message comprises the first list; and
determine a first sidelink synchronization signal based on the identifier of the at least one sidelink synchronization signal in the first list, wherein the first sidelink synchronization signal is used for beam training.

12. The first terminal apparatus according to claim 11, wherein the one or more memories store the program instructions for execution by the at least one processor to determine a first sidelink synchronization signal block set based on the first sidelink synchronization signal, wherein a sidelink synchronization signal block in the first sidelink synchronization signal block set comprises the first sidelink synchronization signal, and the first sidelink synchronization signal block set is used for beam training.

13. The first terminal apparatus according to claim 11, wherein the one or more memories store the program instructions for execution by the at least one processor to:
select an identifier of the first sidelink synchronization signal from the first list; and
determine the first sidelink synchronization signal based on the identifier of the first sidelink synchronization signal.

14. The first terminal apparatus according to claim 13, wherein the one or more memories store the program instructions for execution by the at least one processor to send a third message to the second terminal apparatus, wherein the third message comprises the identifier of the first sidelink synchronization signal, and the third message notifies the second terminal apparatus that the first sidelink synchronization signal is determined based on the identifier of the first sidelink synchronization signal.

15. The first terminal apparatus according to claim 13, wherein the one or more memories store the program instructions for execution by the at least one processor to send a fourth message, wherein the fourth message comprises the identifier of the first sidelink synchronization signal, and the fourth message notifies all terminal apparatuses within an area in which the first terminal apparatus is located that the identifier of the first sidelink synchronization signal has been used.

16. The first terminal apparatus according to claim 11, wherein the one or more memories store the program instructions for execution by the at least one processor to receive the second message from the second terminal apparatus in a first time window.

* * * * *